US012106765B2

(12) United States Patent
Zhang et al.

(10) Patent No.: US 12,106,765 B2
(45) Date of Patent: Oct. 1, 2024

(54) SPEECH SIGNAL PROCESSING METHOD AND APPARATUS WITH EXTERNAL AND EAR CANAL SPEECH COLLECTORS

(71) Applicant: Honor Device Co., Ltd., Shenzhen (CN)

(72) Inventors: Xianchun Zhang, Shenzhen (CN); Jinyun Zhong, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 222 days.

(21) Appl. No.: 17/757,968

(22) PCT Filed: Nov. 9, 2020

(86) PCT No.: PCT/CN2020/127578
§ 371 (c)(1),
(2) Date: Jun. 24, 2022

(87) PCT Pub. No.: WO2021/129197
PCT Pub. Date: Jul. 1, 2021

(65) Prior Publication Data

US 2023/0029267 A1 Jan. 26, 2023

(30) Foreign Application Priority Data

Dec. 25, 2019 (CN) ......................... 201911361036.1

(51) Int. Cl.
*G10L 21/0208* (2013.01)
*G10L 19/02* (2013.01)
(Continued)

(52) U.S. Cl.
CPC .......... *G10L 21/0208* (2013.01); *G10L 19/02* (2013.01); *G10L 21/0324* (2013.01);
(Continued)

(58) Field of Classification Search
CPC ................. G10L 21/02; G10L 21/0208; G10L 2021/02165; G10L 21/038; H04R 1/10; H04R 3/005; H04R 25/305
See application file for complete search history.

(56) References Cited

U.S. PATENT DOCUMENTS 8,473,287 B2 * 6/2013 Every ..................... G10L 25/18 704/226
8,553,922 B2 10/2013 Yataka et al.
(Continued)

FOREIGN PATENT DOCUMENTS

CN 102164326 A 8/2011
CN 102761643 A 10/2012
(Continued)

*Primary Examiner* — Shaun Roberts
(74) *Attorney, Agent, or Firm* — Conley Rose, P.C.

(57) ABSTRACT

A speech signal processing method and apparatus. The method includes preprocessing a speech signal that is in a first frequency band and that is collected by an ear canal speech collector, to obtain a first speech signal; preprocessing a speech signal that is in a second frequency band and that is collected by at least one external speech collector, to obtain an external speech signal, where frequency ranges of the first frequency band and the second frequency band are different; performing correlation processing on the first speech signal and the external speech signal to obtain a second speech signal; and outputting a target speech signal, where the target speech signal includes the first speech signal and the second speech signal.

20 Claims, 3 Drawing Sheets

(51) Int. Cl.

| | |
|---|---|
| ***G10L 21/0324*** | (2013.01) |
| ***G10L 21/038*** | (2013.01) |
| ***H04R 1/10*** | (2006.01) |
| ***H04R 3/00*** | (2006.01) |

(52) U.S. Cl.

CPC .............. *G10L 21/038* (2013.01); *H04R 1/10* (2013.01); *H04R 3/005* (2013.01); *G10L 2021/02082* (2013.01)

(56) References Cited

U.S. PATENT DOCUMENTS

| | | | | |
|---|---|---|---|---|
| 8,693,703 | B2 * | 4/2014 | Rung | H04R 1/10 367/121 |
| 8,751,224 | B2 | 6/2014 | Herve et al. | |
| 9,467,769 | B2 | 10/2016 | Liu et al. | |
| 10,199,029 | B2 | 2/2019 | Hsu et al. | |
| 10,224,016 | B2 | 3/2019 | Gauger, Jr. et al. | |
| 10,516,934 | B1 | 12/2019 | Solbach | |
| 10,560,790 | B2 | 2/2020 | Jones et al. | |
| 11,044,557 | B2 | 6/2021 | Alcock et al. | |
| 2006/0116871 | A1 * | 6/2006 | Kim | G10L 19/0204 704/216 |
| 2007/0067163 | A1 * | 3/2007 | Kabal | G10L 21/038 704/207 |
| 2008/0037801 | A1 * | 2/2008 | Alves | H04R 3/04 381/74 |
| 2009/0290739 | A1 * | 11/2009 | Edwards | H04R 25/305 381/328 |
| 2010/0114583 | A1 * | 5/2010 | Lee | G10L 21/038 704/500 |
| 2011/0216918 | A1 * | 9/2011 | Nagel | G10L 21/038 381/98 |
| 2011/0293109 | A1 * | 12/2011 | Nystrom | H04R 3/005 381/94.2 |
| 2012/0253798 | A1 * | 10/2012 | Walters | H04R 1/406 704/226 |
| 2013/0003983 | A1 * | 1/2013 | Hata | G10K 11/17885 381/74 |
| 2013/0177170 | A1 * | 7/2013 | Aylward | H03G 5/165 381/98 |
| 2014/0010378 | A1 * | 1/2014 | Voix | G10L 21/0216 381/57 |
| 2014/0093091 | A1 * | 4/2014 | Dusan | H04R 1/1083 381/74 |
| 2014/0172421 | A1 * | 6/2014 | Liu | H04R 1/1083 381/94.1 |
| 2016/0267899 | A1 * | 9/2016 | Gauger, Jr. | H04R 1/10 |
| 2017/0078790 | A1 | 3/2017 | Yen et al. | |
| 2017/0311068 | A1 | 10/2017 | Shin | |
| 2018/0268798 | A1 * | 9/2018 | Mustiere | G10K 11/17885 |
| 2019/0214038 | A1 * | 7/2019 | Bouserhal | G10L 25/84 |
| 2019/0325887 | A1 * | 10/2019 | Karkkainen | G10K 11/17827 |
| 2020/0137476 | A1 * | 4/2020 | Shinmen | H04R 1/26 |
| 2020/0312341 | A1 * | 10/2020 | Alves | G10L 21/02 |
| 2021/0092233 | A1 * | 3/2021 | Hua | G10L 21/0208 |

FOREIGN PATENT DOCUMENTS

| | | | |
|---|---|---|---|
| CN | 103269465 | A | 8/2013 |
| CN | 105989835 | A | 10/2016 |
| CN | 106686494 | A | 5/2017 |
| CN | 206640738 | U | 11/2017 |
| CN | 107547962 | A | 1/2018 |
| CN | 107547983 | A | 1/2018 |
| CN | 108322845 | A | 7/2018 |
| CN | 108924352 | A | 11/2018 |
| CN | 110931027 | A | 3/2020 |
| TW | 200808088 | A | 2/2008 |
| WO | 2019086298 | A1 | 5/2019 |

* cited by examiner

SPEECH SIGNAL PROCESSING METHOD AND APPARATUS WITH EXTERNAL AND EAR CANAL SPEECH COLLECTORS

This application is a U.S. National Stage of International Application No. PCT/CN2020/127578 filed on Nov. 9, 2020, which claims priority to Chinese Patent Application No. 201911361036.1, filed with the China National Intellectual Property Administration on Dec. 25, 2019, both of which are incorporated herein by reference in their entireties.

TECHNICAL FIELD

This application relates to the field of signal processing technologies and headsets, and in particular, to a speech signal processing method and apparatus.

BACKGROUND

With the popularity of Bluetooth headsets, an increasing quantity of people prefer to use Bluetooth headsets to connect to mobile phones for calls. One or more microphones (microphone, MIC) are disposed on a Bluetooth headset. When a user makes a call by using the Bluetooth headset, a MIC on the Bluetooth headset may collect a speech signal, and the speech signal may be transmitted to a mobile phone through a Bluetooth channel, and finally, is transmitted to the other party in the call through the mobile phone. In addition to a self-speech signal of the user during the call, the speech signal collected by the MIC of the Bluetooth headset includes external noise. When the external noise is large, the self-speech signal of the user is masked. This affects a call effect. Therefore, there is a requirement for call noise reduction.

FIG. 1 is a schematic diagram of a Bluetooth headset in the prior art. Two MICs are disposed on the Bluetooth headset, and are represented as a MIC1 and a MIC2 in FIG. 1. When a user wears the Bluetooth headset, the MIC1 is close to an ear of the wearer, and the MIC2 is close to a mouth of the wearer. For the Bluetooth headset on which the two MICs are disposed, the following method is usually used in the prior art to reduce noise: combining, through beamforming (beam forming, BF), two channels of speech signals collected by the MIC1 and the MIC2 into one channel of speech signals. Finally, this channel of speech signals are output to a speaker of the Bluetooth headset.

In the foregoing method, in a process of combining two channels of speech signals into one channel of speech signals through beamforming, noise reduction processing is performed only by using speech signals corresponding to a specific included angle range in the two channels of speech signals, to be specific, noise reduction processing can be performed only on speech signals in a frequency band range corresponding to the included angle range. Therefore, a noise reduction effect is poor.

SUMMARY

Technical solutions of this application provide a speech signal processing method and apparatus, to provide a full-band low-noise speech signal.

According to a first aspect, a speech signal processing method is provided, and applied to a headset including at least two speech collectors, where the at least two speech collectors include an ear canal speech collector and at least one external speech collector. The method includes: preprocessing a speech signal in a first frequency band (for example, the first frequency band may be 100 Hz to 4 KHz or 200 Hz to 5 KHz) that is collected by the ear canal speech collector, to obtain a first speech signal, where the preprocessing herein may include related processing used to increase a signal-to-noise ratio of the first speech signal, for example, processing such as noise reduction, amplitude adjustment, or gain adjustment, and the first speech signal may be a call speech signal of a user; preprocessing a speech signal in a second frequency band (for example, the second frequency band may be 100 Hz to 10 KHz) that is collected by the at least one external speech collector, to obtain an external speech signal, where frequency ranges of the first frequency band and the second frequency band are different, and the preprocessing herein may include related processing used to increase a signal-to-noise ratio of the external speech signal, for example, processing such as noise reduction, amplitude adjustment, or gain adjustment, where the external speech signal may include an environment sound signal and a call speech signal of the user; performing correlation processing on the first speech signal and the external speech signal to obtain a second speech signal, where the second speech signal may be the call speech signal of the user in the second frequency band range; and outputting a target speech signal, where the target speech signal includes the first speech signal and the second speech signal.

In the foregoing technical solution, because the ear canal speech collector is located in an ear canal when the user wears the ear canal speech collector, the first speech signal obtained through preprocessing of the speech signal collected by the ear canal speech collector has features of low noise and a narrow frequency band. The external speech collector is located outside an ear canal when being worn, so that the external speech signal obtained through preprocessing of the speech signal collected by the at least one external speech collector has features of large noise and a wide frequency band. Correlation processing is performed on the first speech signal and the external speech signal, so that the second speech signal in the external speech signal can be effectively extracted, and the second speech signal has features of low noise and a wide frequency band. The first speech signal and the second speech signal are self-speech signals of the user in different frequency bands, so that the first speech signal and the second speech signal are output as a target speech signal, thereby outputting a full-band low-noise speech signal, and improving user experience.

In a possible implementation of the first aspect, before the outputting a target speech signal, the method further includes: determining a third speech signal in a third frequency band based on the first speech signal and the second speech signal, where the third frequency band is between the first frequency band and the second frequency band, and the target speech signal further includes the third speech signal, so that the target speech signal is output by outputting the first speech signal, the second speech signal, and the third speech signal. Further, the determining a third speech signal in a third frequency band based on the first speech signal and the second speech signal includes: generating the third speech signal in the third frequency band based on statistical characteristics of the first speech signal and the second speech signal; or generating the third speech signal in the third frequency band based on the first speech signal and the second speech signal through machine learning, model training, or in another manner. In the foregoing possible implementation, when the frequency band ranges of the first frequency band and the second frequency band are different, and do not form a continuous frequency band range, the third speech signal in the third frequency band may be generated based on the first speech signal and the second speech signal, and the third frequency band may be between the first frequency band and the second frequency band, and therefore, forms a relatively wide frequency band range with the first frequency band and the second frequency band. In this way, the first speech signal, the second speech signal, and the third speech signal are output as a target speech signal, so that a full-band low-noise speech signal can be further output, thereby improving user experience.

In a possible implementation of the first aspect, the preprocessing a speech signal in a first frequency band that is collected by the ear canal speech collector includes: performing at least one of the following processing on the speech signal in the first frequency band that is collected by the ear canal speech collector: amplitude adjustment, gain enhancement, echo cancellation, or noise suppression. In the foregoing possible implementation, a case in which an amplitude or a gain of the speech signal in the first frequency band that is collected by the ear canal speech collector may be relatively small, an amplitude or a gain of the speech signal in the second frequency band may be increased to facilitate subsequent processing and identification, and the signal-to-noise ratio of the speech signal may be increased at the same time. In addition, various noise signals such as an echo signal or environmental noise also exist in the speech signal in the first frequency band. At least one of the following processing is performed on the speech signal in the first frequency band: amplitude adjustment, gain enhancement, echo cancellation, or noise suppression, so that the noise signals in the speech signal in the first frequency band can be effectively reduced, and the signal-to-noise ratio can be increased.

In a possible implementation of the first aspect, the preprocessing a speech signal in a second frequency band that is collected by the at least one external speech collector includes: performing at least one of the following processing on the speech signal in the second frequency band that is collected by the at least one external speech collector: amplitude adjustment, gain enhancement, echo cancellation, or noise suppression. In the foregoing possible implementation, a case in which an amplitude or a gain of the speech signal in the second frequency band that is collected by the at least one external speech collector may be relatively small, an amplitude or a gain of the speech signal in the second frequency band may be increased to facilitate subsequent processing and identification, and the signal-to-noise ratio of the speech signal may be increased at the same time. In addition, various noise signals such as an echo signal or environment noise also exist in the speech signal in the second frequency band. Echo cancellation or noise suppression processing is performed on the speech signal in the second frequency band, so that the noise signals in the speech signal in the second frequency band can be effectively reduced, and the signal-to-noise ratio can be increased.

In a possible implementation of the first aspect, the at least one external speech collector includes a first external speech collector and a second external speech collector, and the preprocessing a speech signal in a second frequency band that is collected by the at least one external speech collector includes: performing, by using a speech signal collected by the first external speech collector, noise reduction processing on a speech signal in the second frequency band that is collected by the second external speech collector.

The performing, by using a speech signal collected by the first external speech collector, noise reduction processing on a speech signal in the second frequency band that is collected by the second external speech collector includes: rotating, by 180 degrees, a phase of the speech signal collected by the first external speech collector; canceling, by using the rotated speech signal, noise in the speech signal collected by the second external speech collector; or performing beamforming processing on the speech signal collected by the first external speech collector and the speech signal collected by the second external speech collector, to cancel the noise in the speech signal collected by the second external speech collector.

In the foregoing possible implementation, the speech signal collected by the first external speech collector includes a relatively small call speech signal and a noise signal, and the speech signal collected by the second external speech collector includes a relatively large call speech signal and a noise signal. Therefore, noise reduction processing is performed on the speech signal collected by the second external speech collector by using the speech signal collected by the first external speech collector, so that the noise signal in the speech signal collected by the second external speech collector can be effectively canceled, and the signal-to-noise ratio of the speech signal can be increased.

In a possible implementation of the first aspect, before the outputting a target speech signal, the method further includes: performing at least one of the following processing on the output target speech signal: noise suppression, equalization processing, packet loss compensation, automatic gain control, or dynamic range adjustment. In the foregoing possible implementation, a new noise signal may be generated in a processing process of the speech signal, and a packet loss may occur in a transmission process. At least one of the foregoing processing is performed on the output target speech signal, so that a signal-to-noise ratio of the target speech signal can be effectively increased, and call quality and user experience can be improved.

In a possible implementation of the first aspect, the ear canal speech collector includes at least one of an ear canal microphone or a bone sensor.

In a possible implementation of the first aspect, the at least one external speech collector includes a call microphone or a noise-cancelling microphone.

According to a second aspect, a speech signal processing apparatus is provided, where the apparatus includes at least two speech collectors, the at least two speech collectors include an ear canal speech collector and at least one external speech collector, and the apparatus includes a processing unit, configured to preprocess a speech signal in a first frequency band (for example, the first frequency band may be 100 Hz to 4 KHz, or 200 Hz to 5 KHz) that is collected by the ear canal speech collector, to obtain a first speech signal, where the preprocessing herein may specifically include related processing used to increase a signal-to-noise ratio of the first speech signal, for example, processing such as noise reduction, amplitude adjustment, or gain adjustment, and the first speech signal may be a call speech signal of a user. The processing unit is further configured to preprocess a speech signal in a second frequency band (for example, the second frequency band may be 100 Hz to 10 KHz) that is collected by the at least one external speech collector, to obtain an external speech signal, where frequency ranges of the first frequency band and the second frequency band are different, and the preprocessing herein may specifically include related processing used to increase a signal-to-noise ratio of the external speech signal, for example, processing such as noise reduction, amplitude adjustment, or gain adjustment, where the external speech signal may include an environment sound signal and a call speech signal of the user. The processing unit is further configured to perform correlation processing on the first speech signal and the external speech signal to obtain a second speech signal, where the second speech signal may be the call speech signal of the user in the second frequency band range. The apparatus includes an output unit, configured to output a target speech signal, where the target speech signal includes the first speech signal and the second speech signal.

In a possible implementation of the second aspect, the processing unit is further configured to determine a third speech signal in a third frequency band based on the first speech signal and the second speech signal, where the third frequency band is between the first frequency band and the second frequency band, and the target speech signal further includes the third speech signal. The processing unit is specifically configured to: generate the third speech signal in the third frequency band based on statistical characteristics of the first speech signal and the second speech signal; or generate the third speech signal in the third frequency band based on the first speech signal and the second speech signal through machine learning, model training, or in another manner.

In a possible implementation of the second aspect, the processing unit is specifically configured to perform at least one of the following processing on the speech signal in the first frequency band that is collected by the ear canal speech collector: amplitude adjustment, gain enhancement, echo cancellation, or noise suppression.

In a possible implementation of the second aspect, the processing unit is further specifically configured to perform at least one of the following processing on the speech signal in the second frequency band that is collected by the at least one external speech collector: amplitude adjustment, gain enhancement, echo cancellation, or noise suppression.

In a possible implementation of the second aspect, the at least one external speech collector includes a first external speech collector and a second external speech collector, and the processing unit is specifically configured to perform, by using a speech signal collected by the first external speech collector, noise reduction processing on a speech signal in the second frequency band that is collected by the second external speech collector. The processing unit is specifically configured to: rotate, by 180 degrees, a phase of the speech signal collected by the first external speech collector; cancel, by using the rotated speech signal, noise in the speech signal collected by the second external speech collector; or perform beamforming processing on the speech signal collected by the first external speech collector and the speech signal collected by the second external speech collector, to cancel the noise in the speech signal collected by the second external speech collector.

In a possible implementation of the second aspect, the processing unit is further configured to perform at least one of the following processing on the output target speech signal: noise suppression, equalization processing, packet loss compensation, automatic gain control, or dynamic range adjustment.

In a possible implementation of the second aspect, the ear canal speech collector includes at least one of an ear canal microphone or a bone sensor.

In a possible implementation of the second aspect, the at least one external speech collector includes a call microphone or a noise-cancelling microphone.

In a possible implementation of the second aspect, the speech signal processing apparatus is a headset. For example, the headset may be a wireless headset or a wired headset, and the wireless headset may be a Bluetooth headset, a Wi-Fi headset, an infrared headset, or the like.

According to another aspect of the technical solutions of this application, a computer-readable storage medium is provided. The computer-readable storage medium stores an instruction, and when the instruction runs on a device, the device is enabled to perform the speech signal processing method according to any one of the first aspect or the possible implementations of the first aspect.

According to another aspect of the technical solutions of this application, a computer program product is provided. When the computer program product runs on a device, the device is enabled to perform the speech signal processing method according to any one of the first aspect or the possible implementations of the first aspect.

It may be understood that any one of the apparatus, the computer-readable storage medium, or the computer program product of the speech signal processing method provided above is used to perform the corresponding method provided above. Therefore, for beneficial effects that can be achieved by the apparatus, the computer-readable storage medium, or the computer program product, refer to beneficial effects in the corresponding method provided above. Details are not described herein again.

DESCRIPTION OF EMBODIMENTS

In the embodiments of this application, "at least one" means one or more, and "a plurality of" means two or more than two. The term "and/or" describes an association relationship between associated objects and represents that three relationships may exist. For example, A and/or B may represent the following cases: Only A exists, both A and B exist, and only B exists, where A and B may be singular or plural. The character "/" usually represents an "or" relationship between the associated objects. "At least one of the following items (pieces)" or a similar expression thereof means any combination of these items, including a single item (piece) or any combination of a plurality of items (pieces). For example, at least one (piece) of a, b, or c may indicate a, b, c, a and b, a and c, b and c, or a, b, and c, where a, b, and c may be singular or plural. In addition, in the embodiments of this application, words such as "first" and "second" do not limit a quantity or an execution sequence.

It should be noted that in the embodiments of this application, the word such as "example" or "for example" is used to represent giving an example, an illustration, or a description. Any embodiment or design solution described by using "example" or "for example" in the embodiments of this application shall not be construed as being more preferred or more advantageous than another embodiment or design solution. Exactly, use of the word such as "example" or "for example" is intended to present a related concept in a specific manner.

Figure 1:
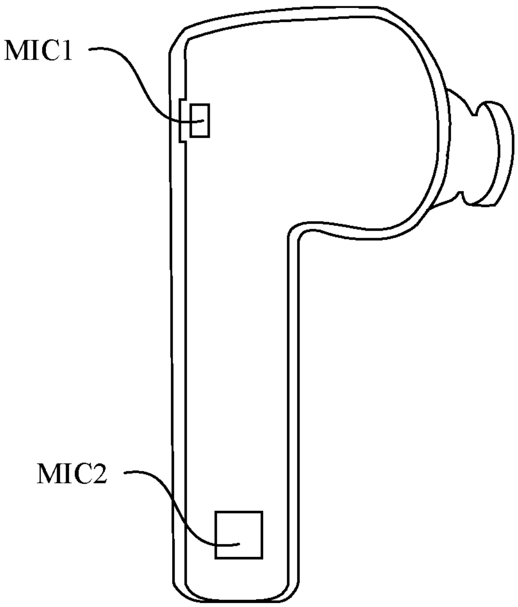
FIG. 1 is a schematic layout diagram of microphones in a headset.
Figure 2:
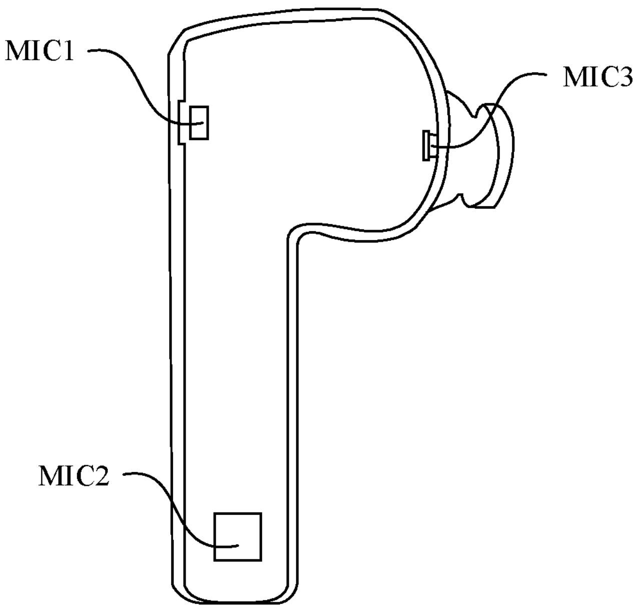
FIG. 2 is a schematic layout diagram of speech collectors in a headset according to an embodiment of this application.

FIG. 2 is a schematic layout diagram of speech collectors in a headset according to an embodiment of this application. At least two speech collectors may be disposed on the headset, and each speech collector may be configured to collect a speech signal. For example, each speech collector may be a microphone, a sound sensor, or the like. The at least two speech collectors may include an ear canal speech collector and an external speech collector. The ear canal speech collector may be a speech collector located in an ear canal of a user when the user wears the headset, and the external speech collector may be a speech collector located outside an ear canal of the user when the user wears the headset.

In FIG. 2, an example in which the at least two speech collectors include three speech collectors, and the three speech collectors are respectively represented as a MIC1, a MIC2, and a MIC3 is used for description. The MIC1 and the MIC2 are external speech collectors. When the user wears the headset, the MIC1 is close to an ear of the wearer, and the MIC2 is close to a mouth of the wearer. The MIC3 is an ear canal speech collector. When the user wears the headset, the MIC3 is located in an ear canal of the wearer. In practical application, the MIC1 may be a noise-cancelling microphone or a feedforward microphone, the MIC2 may be a call microphone, and the MIC3 may be an ear canal microphone or a bone sensor.

The headset may be used in cooperation with various electronic devices such as a mobile phone, a notebook computer, a computer, or a watch in a wired connection manner or a wireless connection manner, to process audio services such as media and a call of the electronic device. For example, the audio services may include: in a call service scenario such as a phone call, a WeChat voice message, an audio call, a video call, a game, and a voice assistant, playing voice data of a peer end for the user, or collecting voice data of the user and sending the voice data to the peer end, and may also include media services such as playing music, recordings, sounds in video files, background music in games, and incoming call prompt tone. In a possible embodiment, the headset may be a wireless headset, and the wireless headset may be a Bluetooth headset, a Wi-Fi headset, an infrared headset, or the like. In another possible embodiment, the headset may be a neck mounted headset, a head mounted headset, an ear mounted headset, or the like.

Further, the headset may further include a processing circuit and a speaker, and the at least two speech collectors and the speaker are both connected to the processing circuit. The processing circuit may be configured to receive and process speech signals collected by the at least two speech collectors, for example, perform noise reduction processing on the speech signals collected by the speech collectors. The speaker may be configured to receive audio data transmitted by the processing circuit, and play the audio data to the user, for example, playing voice data of the other party to the user in a process of performing a call by the user through the mobile phone, or playing audio data on the mobile phone to the user. The processing circuit and the speaker are not shown in FIG. 2.

In some feasible embodiments, the processing circuit may include a central processing unit, a general purpose processor, a digital signal processor (digital signal processor, DSP), a microcontroller, a microprocessor, or the like. In addition, the processing circuit may include another hardware circuit or accelerator, such as an application-specific integrated circuit, a field programmable gate array or another programmable logic device, a transistor logic device, a hardware component, or any combination thereof. The processing circuit may implement or execute various example logical blocks, modules, and circuits described with reference to content disclosed in this application. The processing circuit may also be a combination of processors implementing a computing function, for example, a combination of one or more microprocessors, or a combination of a digital signal processor and a microprocessor.

Figure 3:
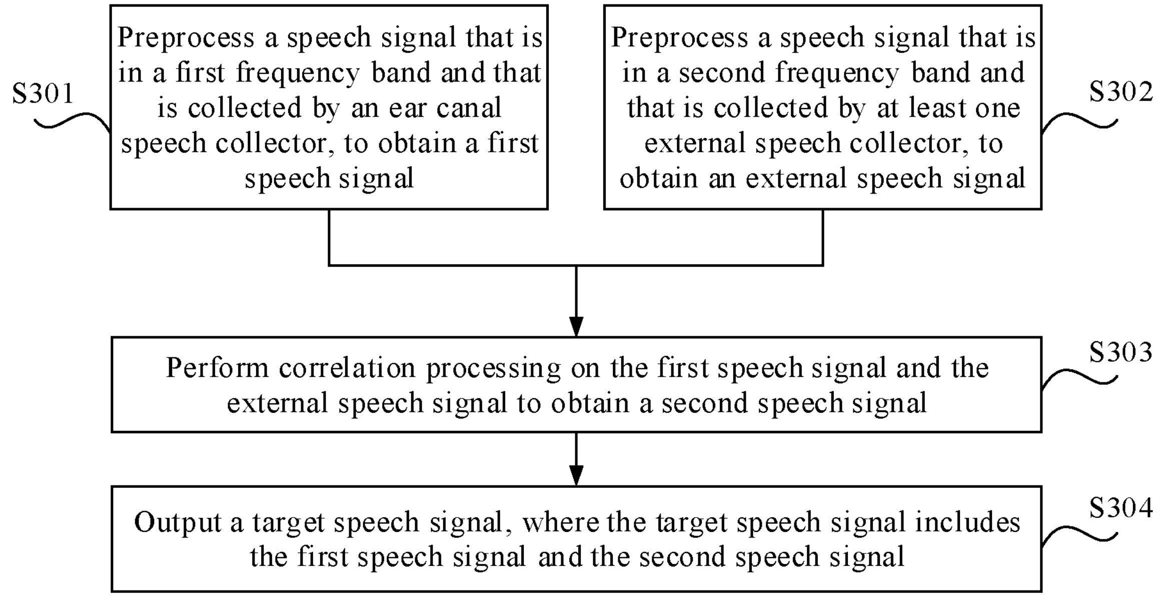
FIG. 3 is a schematic flowchart of a signal processing method according to an embodiment of this application.

FIG. 3 is a schematic flowchart of a speech signal processing method according to an embodiment of this application. The method may be applied to the headset shown in FIG. 2, and may be specifically performed by a processing circuit in the headset. Referring to FIG. 3, the method includes the following steps.

S301: Preprocess a speech signal in a first frequency band that is collected by an ear canal speech collector, to obtain a first speech signal.

The ear canal speech collector may be an ear canal microphone or a bone sensor. When a user wears the headset, an ear canal speech collector is located in an ear canal of the user, and a speech signal in the ear canal has features of less interference and a narrow frequency band. When the user is connected to an electronic device such as a mobile phone by using the headset to perform a call, the ear canal speech collector may collect a speech signal in the ear canal in a call process of the user. Noise in the collected speech signal in the first frequency band is small, and a range of the first frequency band is narrow. The first frequency band may be a low-mid frequency band. For example, the first frequency band may be 100 Hz to 4 KHz or 200 Hz to 5 KHz.

When the ear canal speech collector collects the speech signal in the first frequency band, the ear canal speech collector may transmit the speech signal in the first frequency band to the processing circuit, and the processing circuit preprocesses the speech signal in the first frequency band. For example, the processing circuit performs single-channel noise cancellation on the speech signal in the first frequency band, to obtain the first speech signal. The first speech signal is a speech signal obtained after the noise in the speech signal in the first frequency band is canceled, and the first speech signal may be referred to as a call speech signal or a self-speech signal of the user.

In an implementation solution, the preprocessing of the speech signal in the first frequency band may include the following four separate processing manners, or may include a combination of any two or more of the following four separate processing manners. The following describes the four independent processing methods.

First method: Performing amplitude adjustment processing on the speech signal in the first frequency band.

The performing amplitude adjustment processing on the speech signal in the first frequency band may include: increasing an amplitude of the speech signal in the first frequency band, or decreasing the amplitude of the speech signal in the first frequency band. Amplitude adjustment processing is performed on the speech signal in the first frequency band, so that a signal-to-noise ratio of the speech signal in the first frequency band can be increased.

For example, when an amplitude of a speech signal in the ear canal is relatively small, the amplitude of the speech signal in the first frequency band that is collected by the ear canal speech collector is correspondingly small. In this case, the signal-to-noise ratio of the speech signal in the first frequency band can be increased by increasing the amplitude of the speech signal in the first frequency band, and therefore, the amplitude of the speech signal in the first frequency band can be effectively identified during subsequent processing.

Second method: Performing gain enhancement processing on the speech signal in the first frequency band.

The performing gain enhancement processing on the speech signal in the first frequency band may be: amplifying the speech signal in the first frequency band. A larger amplification multiple (in other words, a larger gain) indicates a larger signal value of the speech signal in the first frequency band. The speech signal in the first frequency band may include the self-speech signal of the user and a noise signal, and the amplifying the speech signal in the first frequency band is amplifying the self-speech signal of the user and the noise signal at the same time.

For example, when the speech signal in the ear canal is relatively weak, a gain of the speech signal in the first frequency band that is collected by the ear canal speech collector is relatively small, and therefore, a relatively large error may be caused during subsequent processing. In this case, gain enhancement processing is performed on the speech signal in the first frequency band, so that the gain of the speech signal in the first frequency band can be increased, and therefore, a processing error of the speech signal in the first frequency band is effectively reduced during subsequent processing.

Third method: Performing echo cancellation processing on the speech signal in the first frequency band.

In a process in which the user makes a call by using the headset, in addition to the speech signal of the user, the speech signal in the first frequency band that is collected by the ear canal speech collector may include an echo signal, where the echo signal may be a sound that is emitted by a speaker of the headset and that is collected by the ear canal speech collector. For example, when a speech signal of the other party in a call with the user is transmitted to the headset and played by using the speaker of the headset, when collecting a speech signal, the ear canal speech collector of the headset collects a speech signal of the user, and also collects a speech signal (namely, an echo signal) of the other party in the call that is played by the speaker, so that the speech signal in the first frequency band that is collected by the ear canal speech collector includes an echo signal.

The performing echo cancellation processing on the speech signal in the first frequency band may be: canceling the echo signal in the speech signal in the first frequency band. For example, the echo signal may be canceled by performing filtering processing on the speech signal in the first frequency band by using an adaptive echo filter. The echo signal is a noise signal, and the signal-to-noise ratio of the speech signal in the first frequency band can be increased by canceling the echo signal, thereby improving quality of a voice call. For a specific implementation process of echo cancellation, refer to descriptions in a related technology of echo cancellation. This is not specifically limited in this embodiment of this application.

Fourth method: Performing noise suppression on the speech signal in the first frequency band.

In a process in which the user makes a call by using the headset, if environmental noise exists in an environment in which the user is located, for example, wind noise, a broadcast sound, or a speaking voice of another person around the user, the speech signal in the first frequency band that is collected by the ear canal speech collector includes the environmental noise. The performing noise suppression on the speech signal in the first frequency band may be: reducing or canceling the environmental noise in the speech signal in the first frequency band. The signal-to-noise ratio of the speech signal in the first frequency band can be increased by canceling the environmental noise. For example, the environment noise in the speech signal in the first frequency band can be canceled by performing filtering processing on the speech signal in the first frequency band.

S302: Preprocess a speech signal in a second frequency band that is collected by at least one external speech collector, to obtain an external speech signal, where frequency ranges of the first frequency band and the second frequency band are different. S302 and S301 may be performed without following a sequence. In FIG. 3, an example in which S302 and S301 are performed in parallel is used for description.

The at least one external speech collector may include one or more external speech collectors. For example, the at least one external speech collector may include a call microphone. When the user wears the headset, an external speech collector is located outside an ear canal of the user, and a speech signal outside the ear canal has features of more interference and a wide frequency band. When the user is connected to an electronic device such as a mobile phone by using the headset to perform a call, the at least one external speech collector may collect a speech signal in a call process of the user. Noise in the collected speech signal in the second frequency band is large, and a range of the second frequency band is wide. The second frequency band may be a mid-high frequency band. For example, the second frequency band may be 100 Hz to 10 KHz.

When the at least one external speech collector collects the speech signal in the second frequency band, the at least one external speech collector may transmit the speech signal in the second frequency band to the processing circuit, and the processing circuit preprocesses the speech signal in the second frequency band to reduce or cancel a noise signal, to obtain the external speech signal. For example, when the at least one external speech collector includes a call microphone, the call microphone may transmit the collected speech signal in the second frequency band to the processing circuit, and the processing circuit cancels the noise signal in the speech signal in the second frequency band.

In an implementation, the method for preprocessing the speech signal in the second frequency band is similar to the method described in S301. To be specific, the four separate processing manners described in S301 may be used, or a combination of any two or more of the four separate processing manners may be used. For a specific process, refer to related descriptions in S301. Details are not described herein again in this embodiment of this application.

When the at least one external speech collector includes a call microphone and a noise-cancelling microphone, preprocessing the speech signal in the second frequency band may further include: performing, by using a speech signal in the second frequency band that is collected by the noise-cancelling microphone, noise reduction processing on a speech signal in the second frequency band that is collected by the call microphone.

In a call process in which the user is connected to an electronic device such as a mobile phone by using the headset, the call microphone is close to a mouth of the wearer, in other words, the call microphone is close to a sound source, so that the speech signal in the second frequency band that is collected by the call microphone includes a relatively large call speech signal and a noise signal. The noise-cancelling microphone is far away from the mouth of the wearer, in other words, the noise-cancelling microphone is far away from the sound source, and the speech signal in the second frequency band that is collected by the noise-cancelling microphone includes a relatively small call speech signal and a noise signal. When the processing circuit receives the speech signals transmitted by the call microphone and the noise-cancelling microphone, the processing circuit may rotate, by 180 degrees, a phase of the speech signal collected by the noise-cancelling microphone, so that the noise signal in the speech signal collected by the call microphone is canceled by using the speech signal obtained after the rotation by 180 degrees.

Alternatively, when noise reduction processing is performed on the speech signal in the second frequency band that is collected by the call microphone by using the speech signal in the second frequency band that is collected by the noise-cancelling microphone, collection directions of the speech signals collected by the noise-cancelling microphone and collected by the call microphone may be further set, so that the noise-cancelling microphone and the call microphone are more sensitive to sounds from one or more specific directions. Therefore, when noise reduction processing is performed, noise reduction processing may be performed on speech signals only in the one or more specific directions by using beamforming, thereby increasing a signal-to-noise ratio of the speech signal in the second frequency band.

S303: Perform correlation processing on the first speech signal and the external speech signal to obtain a second speech signal.

Signal correlation may be a degree of similarity between two signals, and the degree of similarity between the two signals may be determined by using the following Formula (1). In the formula, x(t) and y(t) indicate two signals, and R, (t) indicates a degree of similarity between x(t) and y(t).

$$R_{xy}(\tau) = \sum_{-\infty}^{\infty} x(t)y(t+\tau) \quad (1)$$

When the processing circuit obtains the first speech signal and the external speech signal, the processing circuit may extract, from the external speech signal by performing correlation processing, a speech signal having a relatively high degree of similarity to the first speech signal, to be specific, extracting the second speech signal from the external speech signal. Because the first speech signal is a self-speech signal that is obtained through preprocessing and that is in a user call process, and a degree of correlation between the second speech signal and the first speech signal is relatively high, the second speech signal is a self-speech signal that is in the external speech signal and that is in the user call process. A noise signal can be effectively reduced or canceled through correlation processing, to increase the signal-to-noise ratio of the second speech signal.

Specifically, when the processing circuit obtains the first speech signal and the external speech signal, the processing circuit may convert the first speech signal into a first digital signal, and convert the external speech signal into a second digital signal. A degree of similarity between the first digital signal and the second digital signal is determined, to extract a digital signal with a relatively high degree of similarity to the first digital signal from the second digital signal, and then convert the extracted digital signal with the relatively high degree of similarity into a speech signal, in other words, to obtain the second speech signal.

In an implementation solution, when converting the first speech signal into the first digital signal, and converting the external speech signal into the second digital signal, the processing circuit may convert the first speech signal and the external speech signal into a pulse signal, or another code or signal that may be used for correlation processing. This is not specifically limited in this embodiment of this application.

S304: Output a target speech signal, where the target speech signal includes the first speech signal and the second speech signal.

The first speech signal may be a self-speech signal in the first frequency band in the user call process, and the second speech signal may be a self-speech signal in the second frequency band in the user call process. After obtaining the first speech signal and the second speech signal, the processing circuit may output the first speech signal and the second speech signal as a target speech signal so as to output both the self-speech signals in the first frequency band and the second frequency band, so that a full-band low-noise speech signal is output, thereby improving user experience.

For example, the headset is a Bluetooth headset. After the processing circuit obtains the first speech signal and the second speech signal, the processing circuit may transmit the first speech signal and the second speech signal to the mobile phone of the user through a Bluetooth channel, and finally transmit the first speech signal and the second speech signal to the other party in the call by using the mobile phone of the user.

In a possible implementation, after obtaining the second speech signal, the processing circuit may output only the second speech signal as a target speech signal. Because the second speech signal is obtained by the processing circuit by performing correlation processing, the degree of similarity between the second speech signal and the first speech signal is relatively high, for example, the degree of similarity is greater than 98%. Therefore, when only the second speech signal is output as a target speech signal, the signal-to-noise ratio of the output target speech signal can also be increased.

In another possible implementation, after obtaining the first speech signal, the processing circuit may output only the first speech signal as a target speech signal. When noise in an external environment is relatively large (for example, wind noise is relatively large, whistle noise is relatively large, and self-speech signals of the user are completely submerged), to be specific, a noise signal in a speech signal in the second frequency band that is collected by at least one external sensor is relatively large, and a useful second speech signal cannot be extracted, only the first speech signal may be output as a target speech signal. In this way, it can be ensured that when noise is relatively large, the user can still be connected to an electronic device such as a mobile phone by using the headset to implement a call function.

In an implementation, before outputting the target speech signal, the processing circuit may further perform other processing on the target speech signal, to further increase the signal-to-noise ratio of the target speech signal. Specifically, the processing circuit may perform at least one of the following processing on the target speech signal: noise suppression, equalization processing, packet loss compensation, automatic gain control, or dynamic range adjustment.

A new noise signal may be generated in a processing process of the speech signal. For example, new noise is generated in a noise reduction process and/or a correlation processing process of the speech signal, in other words, the first speech signal and the second speech signal may each include a noise signal, and the noise signals in the first speech signal and the second speech signal may be reduced or canceled through noise suppression processing, thereby increasing the signal-to-noise ratio of the target speech signal.

A packet loss may occur in a transmission process of the speech signal. For example, a packet loss occurs in a process of transmitting a speech signal from a speech collector to the processing circuit, in other words, a packet loss problem may exist in data packets corresponding to the first speech signal and the second speech signal. Therefore, call quality is affected when the first speech signal and the second speech signal are output. Packet loss compensation processing is performed on the first speech signal and the second speech signal, so that the packet loss problem can be resolved, and call quality when the first speech signal and the second speech signal are output is improved.

Gains of the first speech signal and the second speech signal obtained by the processing circuit may be relatively large or relatively small. Therefore, call quality is affected when the first speech signal and the second speech signal are output. Automatic gain control processing and/or dynamic range adjustment are performed on the first speech signal and the second speech signal, so that the gains of the first speech signal and the second speech signal may be adjusted to a proper range, thereby improving call quality and user experience.

Figure 4:
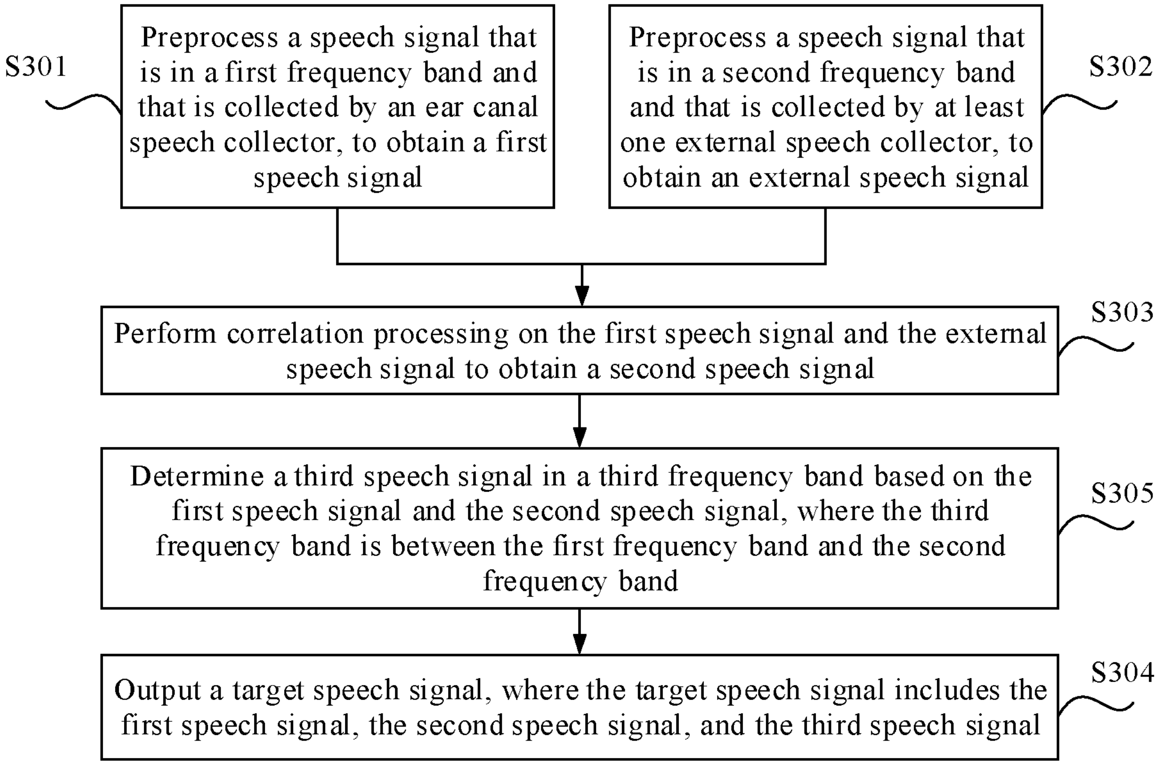
FIG. 4 is a schematic flowchart of another signal processing method according to an embodiment of this application.

Further, as shown in FIG. 4, before S304, the method may further include S305.

S305: Determine a third speech signal in a third frequency band based on the first speech signal and the second speech signal, where the third frequency band is between the first frequency band and the second frequency band.

When the frequency band ranges of the first frequency band and the second frequency band are different, and do not form a continuous frequency band range, the processing circuit may generate the third speech signal in the third frequency band based on statistical characteristics of the first speech signal and the second speech signal, where the third frequency band may be between the first frequency band and the second frequency band, and form a relatively wide frequency band range with the first frequency band and the second frequency band.

For example, if the first frequency band is 200 Hz to 1 KHz, and the second frequency band is 2 KHz to 5 KHz, the processing circuit may train a first speech signal in 200 Hz to 1 KHz and a second speech signal in 2 KHz to 5 KHz to generate a third speech signal in 1 KHz to 2 KHz, to form a speech signal in a frequency band range of 200 Hz to 5 KHz.

Correspondingly, when outputting the target speech signal, the processing circuit may output the first speech signal, the second speech signal, and the third speech signal as a target speech signal. For example, the headset is a Bluetooth headset. After the processing circuit obtains the third speech signal, the processing circuit may transmit the first speech signal, the second speech signal, and the third speech signal to the mobile phone of the user through a Bluetooth channel, and finally transmit the first speech signal, the second speech signal, and the third speech signal to the other party in the call by using the mobile phone of the user.

Because the first speech signal and the second speech signal are the self-speech signals that are obtained after noise cancellation and that are of the user during the call, the third speech signal determined based on the statistical characteristics of the first speech signal and the second speech signal is also a self-speech signal of the user during the call. The three speech signals are output at the same time, so that a full-band target speech signal can be output, thereby improving call quality, and further improving user experience.

The foregoing mainly describes the solutions provided in the embodiments of this application from a perspective of a headset. It may be understood that, to implement the foregoing functions, the headset includes a corresponding hardware structure and/or software module for performing the functions. A person skilled in the art should easily be aware that, in combination with the example steps described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the headset may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in the embodiments of this application, division into modules is an example, and is merely logical function division. In actual implementation, there may be another division manner.

Figure 5:
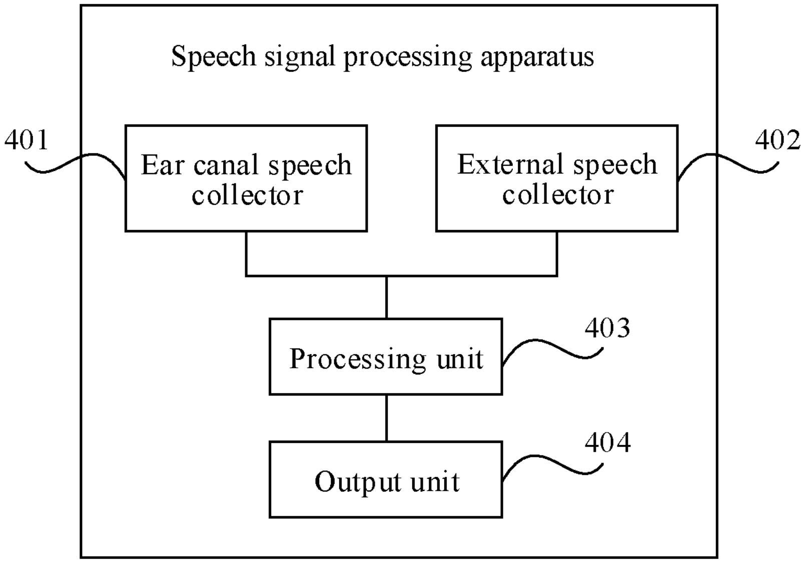
FIG. 5 is a schematic structural diagram of a speech signal processing apparatus according to an embodiment of this application.

When each function module is obtained through division based on each corresponding function, FIG. 5 is a possible schematic structural diagram of a speech signal processing apparatus in the foregoing embodiment. Referring to FIG. 5, the apparatus includes at least two speech collectors, where the at least two speech collectors include an ear canal speech collector 401 and at least one external speech collector 402, and the apparatus further includes a processing unit 403 and an output unit 404. In practical application, the processing unit 403 may be a DSP, a microprocessor circuit, an application-specific integrated circuit, a field programmable gate array or another programmable logic device, a transistor logic device, a hardware component, any combination thereof, or the like. The output unit 404 may be an output interface, a communications interface, or the like.

In this embodiment of this application, the processing unit 403 is configured to preprocess a speech signal in a first frequency band that is collected by the ear canal speech collector 401, to obtain a first speech signal. The processing unit 403 is further configured to preprocess a speech signal in a second frequency band that is collected by the at least one external speech collector 402, to obtain an external speech signal, where frequency ranges of the first frequency band and the second frequency band are different. The processing unit 403 is further configured to perform correlation processing on the first speech signal and the external speech signal to obtain a second speech signal. The output unit 404 is configured to output a target speech signal, where the target speech signal includes the first speech signal and the second speech signal.

In a possible implementation, the processing unit 403 is further configured to determine a third speech signal in a third frequency band based on the first speech signal and the second speech signal, where the third frequency band is between the first frequency band and the second frequency band, and the target speech signal further includes the third speech signal.

Optionally, the processing unit 403 is specifically configured to perform at least one of the following processing on the speech signal in the first frequency band that is collected by the ear canal speech collector: amplitude adjustment, gain enhancement, echo cancellation, or noise suppression.

Optionally, the processing unit 403 is further specifically configured to perform at least one of the following processing on the speech signal in the second frequency band that is collected by the at least one external speech collector: amplitude adjustment, gain enhancement, echo cancellation, or noise suppression; and/or the at least one external speech collector 402 includes a first external speech collector and a second external speech collector, and the processing unit 403 is further specifically configured to perform, by using a speech signal collected by the first external speech collector, noise reduction processing on a speech signal in the second frequency band that is collected by the second external speech collector.

Further, the processing unit 403 is further configured to perform at least one of the following processing on the output target speech signal: noise suppression, equalization processing, packet loss compensation, automatic gain control, or dynamic range adjustment.

In a possible implementation, the ear canal speech collector 401 includes an ear canal microphone or a bone sensor. The at least one external speech collector 402 includes a call microphone and a noise-cancelling microphone.

Figure 6:
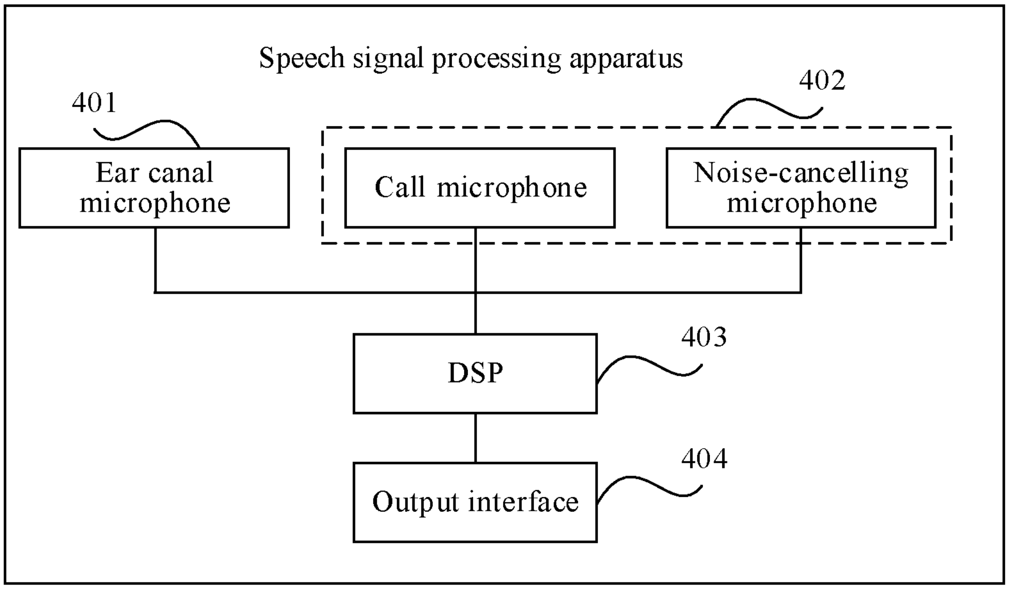
FIG. 6 is a schematic structural diagram of another speech signal processing apparatus according to an embodiment of this application.

For example, FIG. 6 is a schematic structural diagram of a speech signal processing apparatus according to an embodiment of this application. In FIG. 6, an example in which the ear canal speech collector 401 is an ear canal microphone, the at least one external speech collector 402 includes a call microphone and a noise-cancelling microphone, a processing unit 403 is a DSP, and the output unit 404 is an output interface is used for description.

In this embodiment of this application, the first speech signal obtained through preprocessing of the speech signal collected by the ear canal speech collector 401 has features of low noise and a narrow frequency band, and the external speech signal obtained through preprocessing of the speech signal collected by the at least one external speech collector 402 has features of large noise and a wide frequency band. Correlation processing is performed on the first speech signal and the external speech signal, so that the second speech signal in the external speech signal can be effectively extracted, and the second speech signal has features of low noise and a wide frequency band. The first speech signal and the second speech signal are self-speech signals of the user in different frequency bands, so that the first speech signal and the second speech signal are output as a target speech signal, thereby outputting a full-band low-noise speech signal, and improving user experience.

In another embodiment of this application, a computer-readable storage medium is further provided. The computer-readable storage medium stores instructions. When a device (which may be a single-chip microcomputer, a chip, a processing circuit, or the like) runs the instructions, the device is enabled to perform the speech signal processing method provided above. The computer-readable storage medium may include any medium that can store program code, such as a USB flash drive, a removable hard disk, a read-only memory, a random access memory, a magnetic disk, or an optical disc.

In another embodiment of this application, a computer program product is further provided. The computer program product includes instructions, and the instructions are stored in a computer-readable storage medium. When a device (which may be a single-chip microcomputer, a chip, a processing circuit, or the like) runs the instructions, the device is enabled to perform the speech signal processing method provided above. The computer-readable storage medium may include any medium that can store program code, such as a USB flash drive, a removable hard disk, a read-only memory, a random access memory, a magnetic disk, or an optical disc.

At last, it should be noted that the foregoing descriptions are merely specific implementations of this application. However, the protection scope of this application is not limited thereto. Any variation or replacement within the technical scope disclosed in this application shall fall within the protection scope of this application. Therefore, the protection scope of this application shall be subject to the protection scope of the claims.

What is claimed is:

1. A method, comprising:

preprocessing a speech signal from an ear canal speech collector of a headset to obtain a first speech signal, wherein the speech signal from the ear canal speech collector is in a first frequency band;

preprocessing a speech signal from at least one external speech collector of the headset to obtain an external speech signal, wherein the speech signal from the at least one external speech collector is in a second frequency band, and wherein frequency ranges of the first frequency band and the second frequency band are different;

performing correlation processing on the first speech signal and the external speech signal to obtain a second speech signal; and outputting a target speech signal, wherein the target speech signal comprises the first speech signal, the second speech signal, and a third speech signal, wherein the third speech signal is in a third frequency band that is between the first frequency band and the second frequency band, and wherein the third speech signal is derived from the first speech signal and the second speech signal.

2. The method of claim 1, wherein preprocessing the speech signal in the first frequency band from the ear canal speech collector comprises performing, on the speech signal in the first frequency band from the ear canal speech collector, one or more processing operations selected from a group consisting of: amplitude adjustment, gain enhancement, echo cancellation, and noise suppression.

3. The method of claim 1, wherein preprocessing the speech signal the second frequency band from the at least one external speech collector comprises performing, on the speech signal in the second frequency band from the at least one external speech collector, one or more processing operations selected from a group consisting of: amplitude adjustment, gain enhancement, echo cancellation, and noise suppression.

4. The method of claim 1, wherein the at least one external speech collector comprises a first external speech collector and a second external speech collector, and wherein preprocessing the speech signal in the second frequency band from the at least one external speech collector comprises performing, by using a speech signal from the first external speech collector, noise reduction processing on the speech signal in the second frequency band from the second external speech collector.

5. The method of claim 1, wherein before outputting the target speech signal, the method further comprises performing, on the target speech signal, one or more processing operations selected from a group consisting of: noise suppression, equalization processing, packet loss compensation, automatic gain control, and dynamic range adjustment.

6. The method of claim 1, wherein the ear canal speech collector comprises at least one of an ear canal microphone or a bone sensor, and wherein the at least one external speech collector comprises a call microphone or a noise-cancelling microphone.

7. The method of claim 1, wherein deriving the third speech signal from the first speech signal and the second speech signal comprises:

generating the third speech signal based on statistical characteristics of the first speech signal and the second speech signal; or generating the third speech signal based on applying machine learning or model training to the first speech signal and the second speech signal.

8. A device, comprising:

an ear canal speech collector;

at least one external speech collector;

a processor coupled to the ear canal speech collector and the at least one external speech collector, wherein the processor is configured to:

preprocess a speech signal from the ear canal speech collector to obtain a first speech signal, wherein the speech signal from the ear canal speech collector is in a first frequency band;

preprocess a speech signal from the at least one external speech collector to obtain an external speech signal, wherein the speech signal from the at least one external speech collector is in a second frequency band, and wherein frequency ranges of the first frequency band and the second frequency band are different; and perform correlation processing on the first speech signal and the external speech signal to obtain a second speech signal; and a speaker, configured to output a target speech signal, wherein the target speech signal comprises the first speech signal, the second speech signal, and a third speech signal, wherein the third speech signal is in a third frequency band that is between the first frequency band and the second frequency band, and wherein the third speech signal is derived from the first speech signal and the second speech signal.

9. The device of claim 8, wherein the processor is configured to perform, on the speech signal in the first frequency band from the ear canal speech collector, one or more processing operations selected from a group consisting of: amplitude adjustment, gain enhancement, echo cancellation, and noise suppression.

10. The device of claim 8, wherein the processor is configured to perform, on the speech signal in the second frequency band from the at least one external speech collector, one or more processing operations selected from a group consisting of: amplitude adjustment, gain enhancement, echo cancellation, and noise suppression.

11. The device of claim 8, wherein the at least one external speech collector comprises a first external speech collector and a second external speech collector, and wherein the processor is configured to perform, by using a speech signal from the first external speech collector, noise reduction processing on a speech signal in the second frequency band from the second external speech collector.

12. The device of claim 8, wherein the processor is configured to perform, on the target speech signal, one or more processing operations selected from a group consisting of: noise suppression, equalization processing, packet loss compensation, automatic gain control, and dynamic range adjustment.

13. The device claim 8, wherein the ear canal speech collector comprises at least one of an ear canal microphone or a bone sensor.

14. The device of claim 8, wherein the at least one external speech collector comprises a call microphone or a noise-cancelling microphone.

15. The device of claim 8, wherein the device is a headset.

16. A non-transitory, computer-readable storage medium containing instructions that, when executed by a processor of a device, cause the device to be configured to:

preprocess a speech signal from an ear canal speech collector to obtain a first speech signal, wherein the speech signal from the ear canal speech collector is in a first frequency band;

preprocess a speech signal from at least one external speech collector to obtain an external speech signal, wherein the speech signal from the at least one external speech collector is in a second frequency band, and wherein frequency ranges of the first frequency band and the second frequency band are different;

perform correlation processing on the first speech signal and the external speech signal to obtain a second speech signal; and output a target speech signal, wherein the target speech signal comprises the first speech signal, the second speech signal, and a third speech signal, wherein the third speech signal is in a third frequency band that is between the first frequency band and the second frequency band, and wherein the third speech signal is derived from the first speech signal and the second speech signal.

17. The non-transitory, computer-readable storage medium of claim 16, wherein the instructions, when executed by the processor, cause the device to be configured to perform, on the speech signal in the first frequency band from the ear canal speech collector, one or more processing operations selected from a group consisting of: amplitude adjustment, gain enhancement, echo cancellation, and noise suppression.

18. The non-transitory, computer-readable storage medium of claim 16, wherein the instructions, when executed by the processor, cause the device to be configured to perform, on the speech signal in the second frequency band from the at least one external speech collector, one or more processing operations selected from a group consisting of: amplitude adjustment, gain enhancement, echo cancellation, and noise suppression.

19. The non-transitory, computer-readable storage medium of claim 16, wherein the at least one external speech collector comprises a first external speech collector and a second external speech collector, and wherein the instructions, when executed by the processor, cause the device to be configured to perform, by using a speech signal from the first external speech collector, noise reduction processing on a speech signal in the second frequency band from the second external speech collector.

20. The non-transitory, computer-readable storage medium of claim 16, wherein the instructions, when executed by the processor, cause the device to be configured to perform, on the target speech signal, one or more processing operations selected from a group consisting of: noise suppression, equalization processing, packet loss compensation, automatic gain control, and dynamic range adjustment.

* * * * *